United States Patent
Yue et al.

(10) Patent No.: US 8,200,781 B2
(45) Date of Patent: *Jun. 12, 2012

(54) METHOD AND APPARATUS FOR TRANSPORTING/RECEIVING NOTIFICATION MESSAGES VIA FILE DELIVERY OVER UNIDIRECTIONAL PROTOCOL

(75) Inventors: Pieyu Yue, Shenzhen (CN); Teng Shi, Shenzhen (CN); Jie Zhang, Shenzhen (CN); Li Chen, Shenzhen (CN); Xin Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,551

(22) Filed: Aug. 4, 2011

(65) Prior Publication Data

US 2011/0295975 A1    Dec. 1, 2011

Related U.S. Application Data

(63) Continuation of application No. 12/345,994, filed on Dec. 30, 2008, now Pat. No. 8,010,626, which is a continuation of application No. PCT/CN2007/071278, filed on Dec. 19, 2007.

(30) Foreign Application Priority Data

Apr. 24, 2007   (CN) .......................... 2007 1 0101716

(51) Int. Cl.
*G06F 15/16*    (2006.01)

(52) U.S. Cl. .................. 709/217; 709/227; 709/228

(58) Field of Classification Search .................. 709/217, 709/227, 228
See application file for complete search history.

(56) References Cited

U.S. PATENT DOCUMENTS

| 6,411,967 | B1 | 6/2002 | Van Renesse |
| 7,653,668 | B1 | 1/2010 | Shelat et al. |

(Continued)

FOREIGN PATENT DOCUMENTS

WO    WO 2006008593 A1    1/2006

OTHER PUBLICATIONS

Office Action issued in corresponding Chinese Patent Application No. 200710101716.0, mailed Sep. 1, 2011.

*Primary Examiner* — Brian P Whipple
(74) *Attorney, Agent, or Firm* — Brinks Hofer Gilson & Lione (57) ABSTRACT

A method for transporting/receiving notification messages via File Delivery over Unidirectional Transport (FLUTE) includes: At the transmitting end, a server carries a notification content in a transport object and carries notification related information and a transport object identifier (TOI) of the transport object carrying the notification content in a first file description table (FDT), and then sends the first FDT and the transport object carrying the notification content in a FLUTE session; the receiving end obtains the notification related information and the TOI of the transport object carrying the notification content from the first FDT, and receives the transport object carrying the notification content according to the obtained related information and the TOI. A server for transporting notification messages via FLUTE, a FLUTE server, a content server and a terminal are also disclosed. With the present invention, the notification transport procedure is simpler and the reliability of notification transport is better.

18 Claims, 9 Drawing Sheets

U.S. PATENT DOCUMENTS

| | | |
|---|---|---|
| 8,032,647 B2 * | 10/2011 | Shon et al. .................. 709/230 |
| 2006/0015568 A1 | 1/2006 | Walsh et al. |
| 2006/0059267 A1 | 3/2006 | Cugi et al. |
| 2007/0050820 A1 | 3/2007 | Saarikivi et al. |
| 2007/0168523 A1 * | 7/2007 | Jiang et al. .................. 709/228 |
| 2008/0222300 A1 * | 9/2008 | Bouazizi .................. 709/231 |

* cited by examiner

METHOD AND APPARATUS FOR TRANSPORTING/RECEIVING NOTIFICATION MESSAGES VIA FILE DELIVERY OVER UNIDIRECTIONAL PROTOCOL

CROSS-REFERENCE TO RELATED APPLICATIONS

This application is a continuation of U.S. patent application Ser. No. 12/345,994, filed on Dec. 28, 2008, which is a continuation of International Application No. PCT/CN2007/071278, filed on Dec. 19, 2007, and which claims priority to Chinese Patent Application No. 200710101716.0, filed on Apr. 24, 2007, each of which is incorporated herein by reference in its entirety.

TECHNICAL FIELD

The present disclosure relates to mobile multimedia technologies, and in particular, to a method and apparatus for transporting/receiving notification messages via the File Delivery over Unidirectional Transport (FLUTE) protocol.

BACKGROUND OF THE INVENTION

File Delivery over Unidirectional Transport (FLUTE) is an Internet Protocol (IP) based point-to-multipoint file transfer protocol. FLUTE provides congestion control and forward error correction functions for unidirectional transfer of multiple files and therefore ensures the reliability in transferring large-sized files in one direction.

Figure 1:
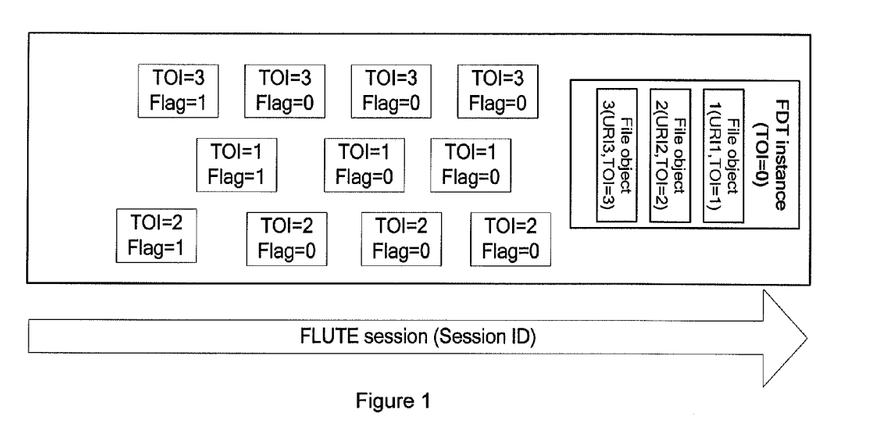
FIG. 1 shows the structure of transport objects in a FLUTE session in the conventional art.

In FLUTE, one file is carried in one transport object (TO). Every transport object has a transport object identifier (TOI) and multiple transport objects are transferred in one FLUTE session. According to FLUTE, the transport object with TOI=0 is used to transfer a file description table (FDT). The FDT describes information of the transport objects transferred by the current FLUTE session, including TOI, uniform resource locator (URL) of the file carried by a transport object, and file type. FIG. 1 shows the structure of transport objects in a FLUTE session in the conventional art. As shown in FIG. 1, three files are respectively packed and carried in three transport objects, where Flag is an end mark, Flag=0 means the file does not end and Flag=1 means the file ends; the FDT describes the TOI and URL information of the three transport objects.

Figure 2:
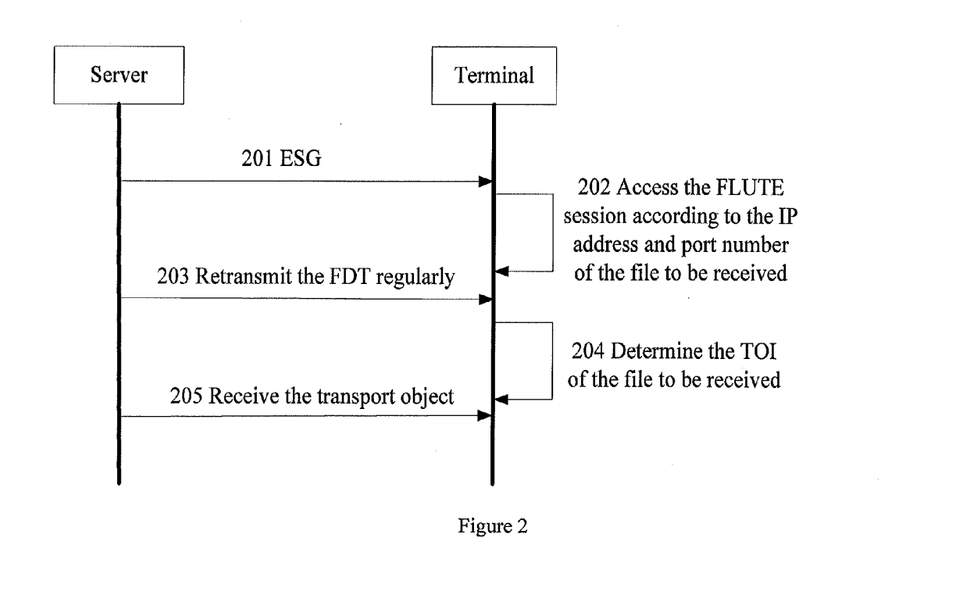
FIG. 2 shows the typical procedure of a FLUTE session in a DVB-H system in the conventional art.

At present, FLUTE is widely applied to various mobile video broadcasting systems. FIG. 2 shows a traditional procedure of a FLUTE session in a digital video broadcasting—handheld (DVB-H) system. As shown in FIG. 2, the procedure includes:

Step 201: A server sends to a terminal an electronic service guide (ESG) which carries file reception information including IP address, port number and file URL.

Step 202: The terminal accesses a FLUTE session according to the IP address and the port number of the file to be received. Here, the file to be received is the file that the terminal determines to receive according to the ESG.

Steps 203 and 204: The server retransmits the FDT repeatedly; the terminal receives the FDT and determines the TOI corresponding to the file to be received according to the FDT and the URL of the file.

Step 205: The terminal receives the corresponding transport object according to the TOI.

Now, the traditional procedure of a FLUTE session in a prior DVB-H system comes to an end.

Figure 3:
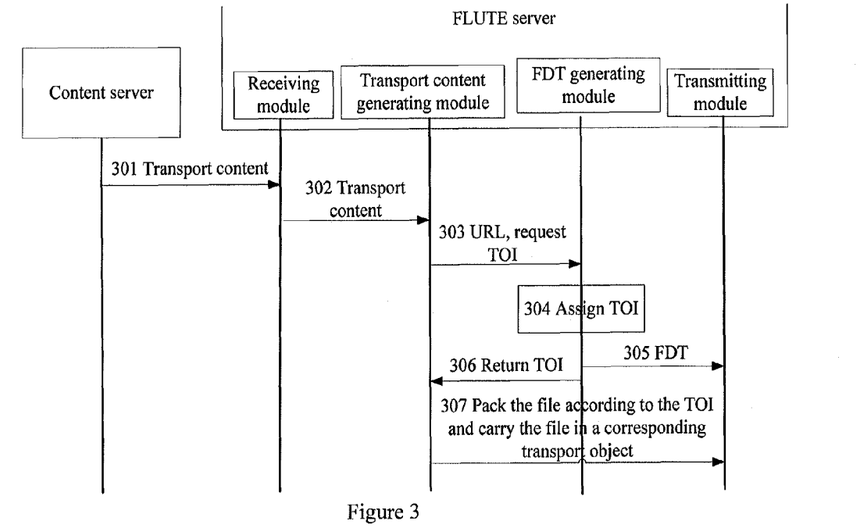
FIG. 3 shows the processing procedure at the server in a FLUTE session shown in FIG. 2.

FIG. 3 shows processing procedure at the server in the FLUTE session shown in FIG. 2. For easy description, FIG. 3 only shows the processing procedure at the server that is related to the FLUTE protocol without showing other procedures such as the processing procedure at the ESG server. In the procedure shown in FIG. 3, the server includes a content server and a FLUTE server, where the FLUTE server includes a receiving module, a transport content generating module, an FDT generating module and a transmitting module. The procedure includes the following steps:

Step 301: The content server sends transport contents to the receiving module of the FLUTE server; here the transport contents include a file and a URL of the file.

Step 302: The receiving module sends the received transport contents to the transport content generating module.

Step 303: The transport content generating module sends the URL of the file to the FDT generating module and requests a TOI required for transferring the file from the FDT generating module.

Steps 304-306: The FDT generating module assigns a TOI to the file according to the URL of the file and returns the assigned TOI to the transport content generating module, and generates an FDT according to the TOI and URL of the file and sends the generated FDT to the broadcasting network via the transmitting module.

Step 307: The transport content generating module packs the file in a corresponding transport object according to the TOI and sends the transport object to the broadcasting network via the transmitting module.

Now, the processing procedure at the server in a FLUTE session is complete.

Notification is a service provided over a mobile video broadcasting system, which sends a message to a terminal to notify a forthcoming event. The terminal may carry out appropriate processing according to the received notification message. Notification messages include but are not limited to: emergency events, system related notifications (like failure of a certain system function), events related to program contents (like information of program actors and actresses, awarded questions and answers, program forecast messages, and paid weather forecast information) and software update notifications.

Figure 4:
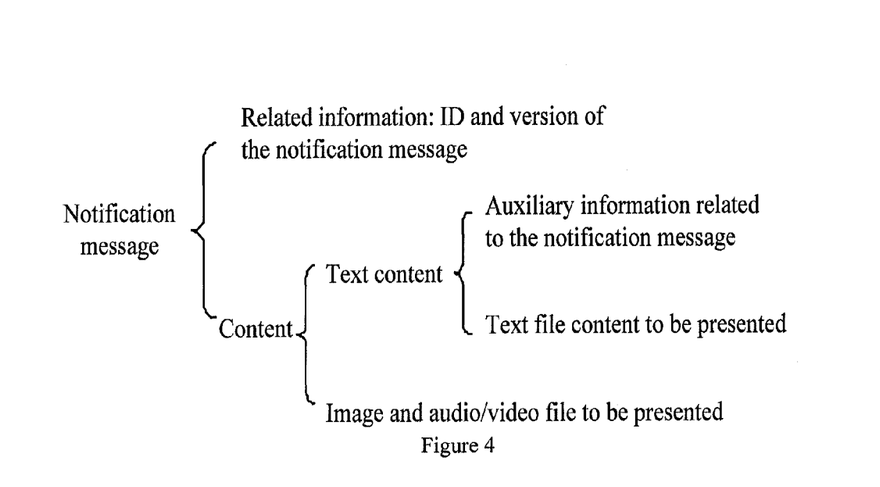
FIG. 4 shows the structure of a notification message in the conventional art.

FIG. 4 shows structure of a notification message in the conventional art. As shown in FIG. 4, a notification message includes two parts, which are related information and content. The related information includes parameter information related to the notification message, such as ID and version of the notification message; the content part includes text content, and image or audio/video file, where the text content further includes two parts: one is the text file content to be presented to the user and the other is auxiliary information related to the notification message, such as an IP address and a port number of the FLUTE session where the image and/or audio/video file resides and information about how to present the message to the user.

Figure 5:
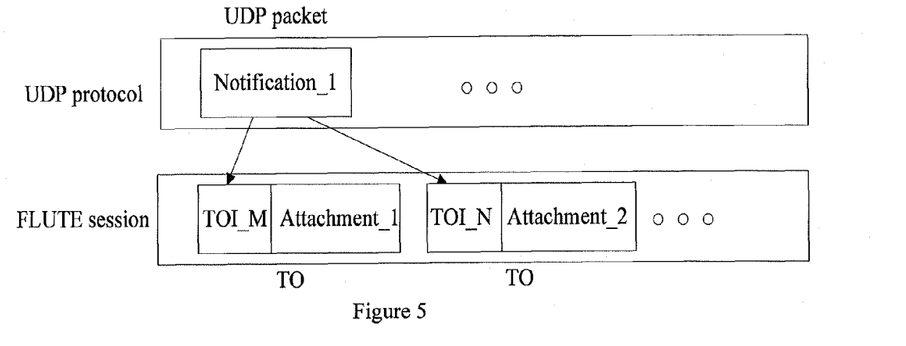
FIG. 5 shows a method for transporting notification messages via BCAST in the conventional art.

The prior broadcast (BCAST) protocol provides a method for transporting notification messages, as shown in FIG. 5.

First, the server sends the related information and content of a notification message over the User Datagram Protocol (UDP), and sends the image and/or audio/video file (usually referred to an attachment) by carrying it in a corresponding transport object according to the processing procedure at the server shown in FIG. 3.

Then, the terminal receives the UDP packet at the specified UDP address and port number and parses the text content in the UDP packet to obtain the IP address, the port number and TOI of the FLUTE session of the attachment.

Then the terminal accesses the FLUTE session in the method shown in FIG. 2 to receive the corresponding transport object, or attachment, and finally assembles the attachment content and the text content to a complete notification message and presents the message to the user.

The applicant, however, finds that in the method shown in FIG. 5, the terminal must first access the UDP protocol, and then access a FLUTE session, which means the terminal must access two IP addresses so as to receive a notification message. As a result, the procedure of the prior method is complex and it is slow for the terminal to obtain a complete notification message. Furthermore, because of the unreliability of transport over UDP, the reliability in transporting notification messages cannot be ensured.

SUMMARY OF THE INVENTION

An embodiment provides a method for transporting notification messages via the File Delivery over Unidirectional Transport (FLUTE) protocol so as to simplify the notification transport procedure and improve reliability of notification transport.

Another embodiment provides a method for receiving notification messages via FLUTE so as to simplify the notification transport procedure and improve reliability of notification transport.

Still another embodiment provides a server for transporting notification messages via FLUTE so as to simplify the notification transport procedure and improve reliability of notification transport.

Still another embodiment provides a FLUTE server so as to simplify the notification transport procedure and improve reliability of notification transport.

Still another embodiment provides a content server so as to simplify the notification transport procedure and improve reliability of notification transport.

Still another embodiment provides a terminal for receiving notification messages via FLUTE so as to simplify the notification transport procedure and improve reliability of notification transport.

The technical solution of the embodiments are implemented as follows:

A method for transporting a notification message via FLUTE includes:

carrying a notification content in a transport object and carrying notification related information and a transport object identifier (TOI) of the transport object that carries the notification content in a first file description table (FDT); and sending the first FDT and the transport object that carries the notification content in a FLUTE session.

A method for receiving a notification message via FLUTE includes:

obtaining notification related information and a TOI of a transport object that carries a notification content from a first FDT; and receiving the transport object that carries the notification content in a current FLUTE session according to the obtained related information and the TOI.

A server for transporting a notification message via FLUTE includes a content server and a FLUTE server, where:

the content server is adapted to send a notification content and notification related information to the FLUTE server; and the FLUTE server is adapted to carry the notification content in a transport object, carry the notification related information and the TOI of the transport object that carries the notification content in a first FDT, and send the first FDT and the transport object that carries the notification content in a FLUTE session.

A FLUTE server includes a receiving module, a transport content generating module, an FDT generating module and a transmitting module, where:

the receiving module is adapted to receive a notification content and notification related information;

the transport content generating module is adapted to send the notification related information from the receiving module to the FDT generating module and carry the notification content in a transport object corresponding to a TOI returned by the FDT generating module;

the FDT generating module is adapted to carry the notification related information and TOI of the transport object that carries the notification content in a first FDT; and the transmitting module is adapted to send the first FDT and the transport object that carries the notification content in a FLUTE session.

A content server includes a notification transmitting module, where:

the notification transmitting module is adapted to send a notification content and notification related information to a FLUTE server.

A terminal for receiving a notification message via FLUTE includes a receiving module and a transport object determining module, where:

the receiving module is adapted to receive a first FDT that carries notification related information and a TOI of a transport object that carries a notification content and send the first FDT to the transport object determining module; and the transport object determining module is adapted to determine a transport object that carries the notification content according to the notification related information and the TOI in the first FDT and notify the receiving module to receive the transport object.

In the above description of the technical solution disclosed by the embodiments for transporting/receiving a notification message via FLUTE, at the transmitting end, the server carries a notification content in a transport object and carries the notification related information and the TOI of the transport object that carries the notification content in a first FDT, and then sends the first FDT that carries the notification related information and the TOI along with the transport object that carries the notification content in a FLUTE session; at the receiving end, the terminal obtains the the notification related information and the TOI from the first FDT which are being transported in the current FLUTE session, and then receives the transport object that carries the notification content in the current FLUTE session according to the obtained notification related information and TOI. Thus, the procedure for transporting/receiving a notification message is implemented.

In the above technical solution provided in the disclosed embodiments, because the server is able to send the related information and content of a notification message to a terminal, the terminal is able to receive the related information and content of the notification message in the current FLUTE session. Therefore, it is simpler to transport a notification message and quicker for the terminal to obtain the notification message. In addition, because the FLUTE protocol itself provides forward error correction, the reliability of notification transport is ensured.

DETAILED DESCRIPTION OF ILLUSTRATIVE EMBODIMENTS

For better understanding of the objective, technical solution and advantages of the embodiments, the embodiments are hereinafter described in detail with reference to the accompanying drawings.

Figure 6:
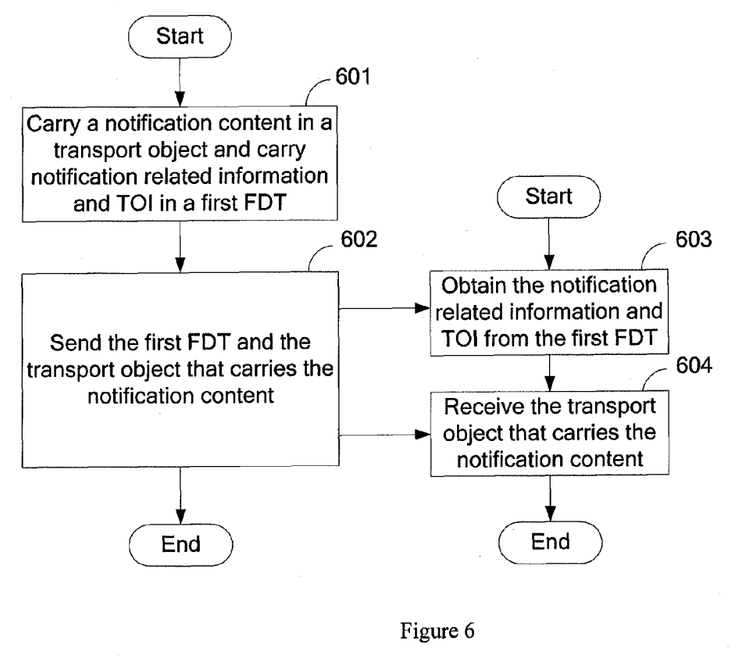
FIG. 6 shows the procedure of a method for transporting/receiving notification messages via FLUTE according to embodiments.

FIG. 6 shows the procedure of a method for transporting/receiving notification messages via FLUTE according to an embodiment. As shown in FIG. 6, the method includes two processes: the left side is a process of transporting a notification message via FLUTE at the server; the right side is a process of receiving a notification message via FLUTE at the terminal. Specifically, the method includes the following steps:

Step 601: The server carries a notification content in a transport object and carries the notification related information and TOI of the transport object carrying the notification content in a first FDT.

Step 602: The server sends the first FDT that carries the notification related information and the TOI of the transport object carrying the notification content, and the transport object that carries the notification content.

Step 603: The terminal obtains from the first FDT the related information of the notification being transported in the current FLUTE session and the TOI of the transport object carrying the notification content.

Step 604: The terminal receives the transport object carrying the notification content in the current FLUTE session according to the obtained notification related information and the TOI.

Now, the procedure of the method for transporting/receiving a notification message via FLUTE in the embodiment ends.

In the method shown in FIG. 6, the first FDT may be an FDT carried by a transport object with TOI=0, that is, a general FDT. In this case, the general FDT needs to be extended accordingly so that the general FDT can carry the related information of the notification being transported in the current FLUTE session and carry the TOI of the transport object carrying the notification content.

The first FDT may also be a special FDT pre-added in the FLUTE session. The special FDT describes information of the transport object carrying the notification content in the current FLUTE session. Here, a general FDT may be extended to a special FDT and the extended special FDT may be carried in a transport object corresponding to a preset TOI, for example, carried in a transport object with TOI=Y, where Y is any positive integer. The value of Y may be made known to the server and the terminal in a preset mode. To improve the flexibility of the technical solution, the value of Y may also be dynamically specified by the server and the server may notify the terminal of the TOI of the transport object used to transport the special FDT. The method by which the server notifies the terminal is detailed in the following embodiments.

The following details the method for transporting a notification message via FLUTE and the method for receiving a notification message via FLUTE in two embodiments.

One Embodiment

In the one embodiment, the server uses the above general FDT as the first FDT, which means that the notification related information and the TOI of the transport object carrying the notification content are carried in the general FDT. Accordingly, the terminal obtains the notification related information and the TOI of the transport object carrying the notification content from the general FDT and receives the corresponding transport object according to the obtained notification related information and the TOI.

Figure 7:
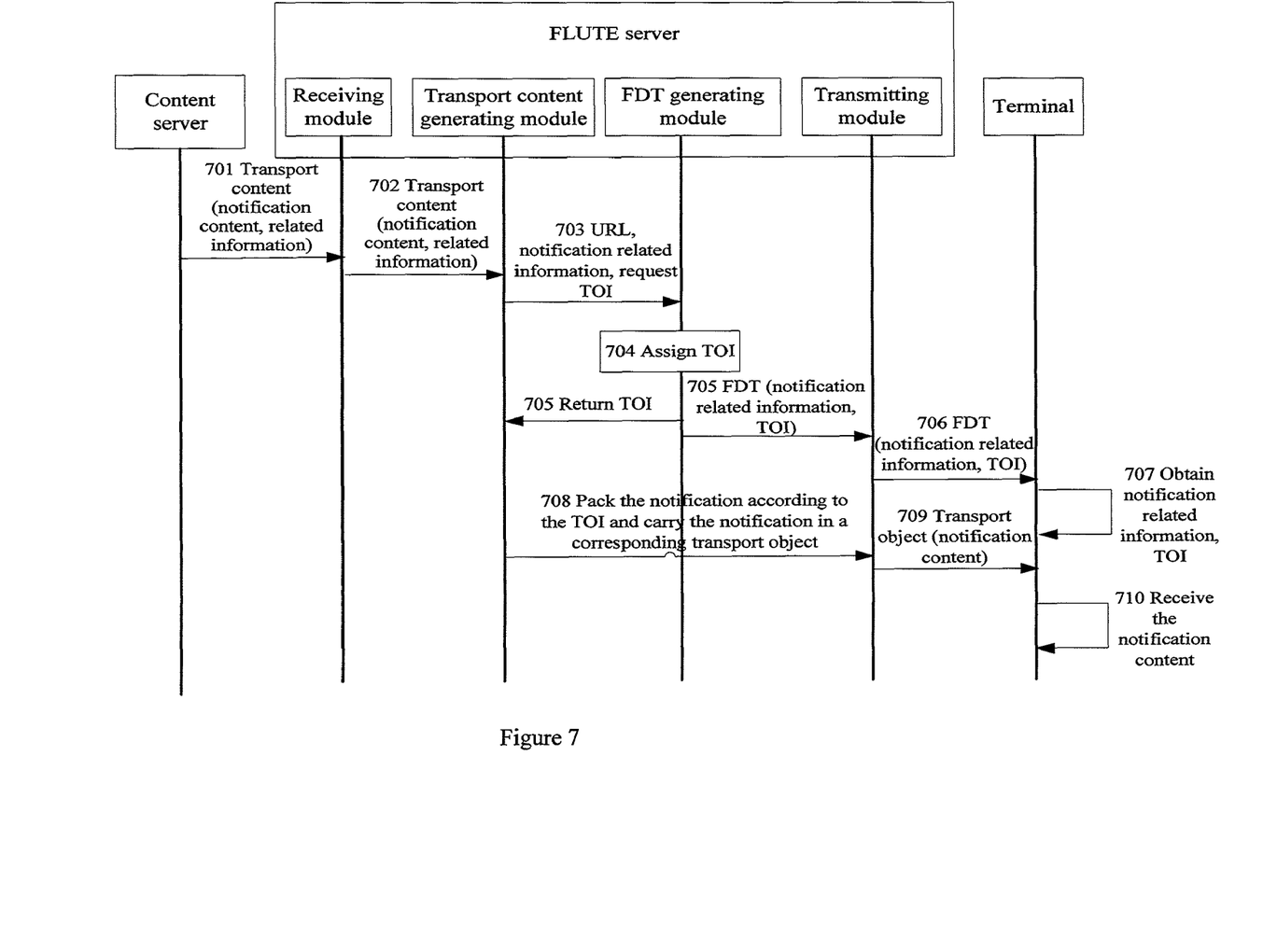
FIG. 7 shows the procedure of a method for transporting/receiving notification messages via FLUTE in one embodiment.

FIG. 7 shows the procedure of a method for transporting/receiving a notification according to the one embodiment. As shown in FIG. 7, the method includes the following steps:

Step 701: The content server sends the transport content that includes the notification content and the notification related information to a receiving module of the FLUTE server.

In this step, the notification related information includes at least: an ID of the notification, a version of the notification, and a service ID of the notification; the notification related information may further include other related information of the notification message, such as a filter parameter of the notification, an expiry time of the notification, a priority of the notification, and a provider ID of the notification. Here, the filter parameter of the notification may act as a filter condition for filtering the notification message at the receiving end.

Step 702: The receiving module sends the received transport content to the transport content generating module.

Step 703: The transport content generating module sends the URL of the notification content and the notification related information to the FDT generating module and requests from the FDT generating module a TOI required for transporting the notification content.

Step 704: The FDT generating module assigns a TOI to the notification content according to the URL of the notification content.

Step 705: The FDT generating module sends the assigned TOI to the transport content generating module, generates an FDT according to the notification related information and the TOI assigned to the notification content, and sends the generated FDT to the transmitting module.

According to the FLUTE protocol, an FDT instance may be defined in the extendable markup language (XML) format. An FDT may contain the information listed in Table 1.

TABLE 1

| Parameter | Type | Quantity | Description |
|---|---|---|---|
| FDT-Instance | E | 1 | FDT instance element. |
| anyAttribute | A | | anyAttribute may be extended to any other attribute. |
| ... | ... | ... | ... |
| FILE | E1 | 0 ... N | File element, describing a file. |
| Content-Location | A | 1 | File location attribute, described by a URL address. |
| TOI | A | 1 | Transport object identifier. |
| Content-Type | A | 0 ... 1 | File type. |

In Table 1, E stands for an element, A for an attribute, E1 for a sub-element, and E2 for a sub-element of the sub-element. To carry the notification related information and the TOI of the transport object carrying the notification content in the general FDT described in Table 1, it is necessary to extend the general FDT accordingly. In the one embodiment, the FDT is extended as follows:

In the Content-Type attribute of the FILE element of the general FDT, a Notification type is added, indicating that the corresponding transport object carries a notification message; and a notification related element Notifi is added in the FILE element of the general FDT for carrying the notification related information. After the above extension, the extended FDT is as shown in Table 2.

TABLE 2

| Parameter | Type | Quantity | Description |
|---|---|---|---|
| FDT-Instance | E | 1 | FDT instance element. |
| anyAttribute | A | | anyAttribute may be extended to any other attribute. |
| ... | ... | ... | ... |
| FILE | E1 | 0 ... N | File element, describing a file. |
| Content-Location | A | 1 | File location attribute, described by a URL address. |
| TOI | A | 1 | Transport object identifier. |
| Content-Type | A | 0 ... 1 | File type. |
| Notifi | E2 | 0 ... 1 | Notification related element. |
| Header | E3 | 1 | Message header information. |
| XX | A | | |
| ... | ... | ... | ... |
| HeaderExtension | E3 | 1 | Message header extension information. |
| XX | A | | |
| ... | ... | ... | ... |

The notification related information is usually categorized into header information and header extension information according to notification related information relevance, where the information related to a content is header information and the information related to a technology is header extension information. Therefore, preferably, two sub-elements may be added in the Notifi element to respectively carry the header information of the notification and the header extension information of the notification, as shown in Table 2.

Figure 8:
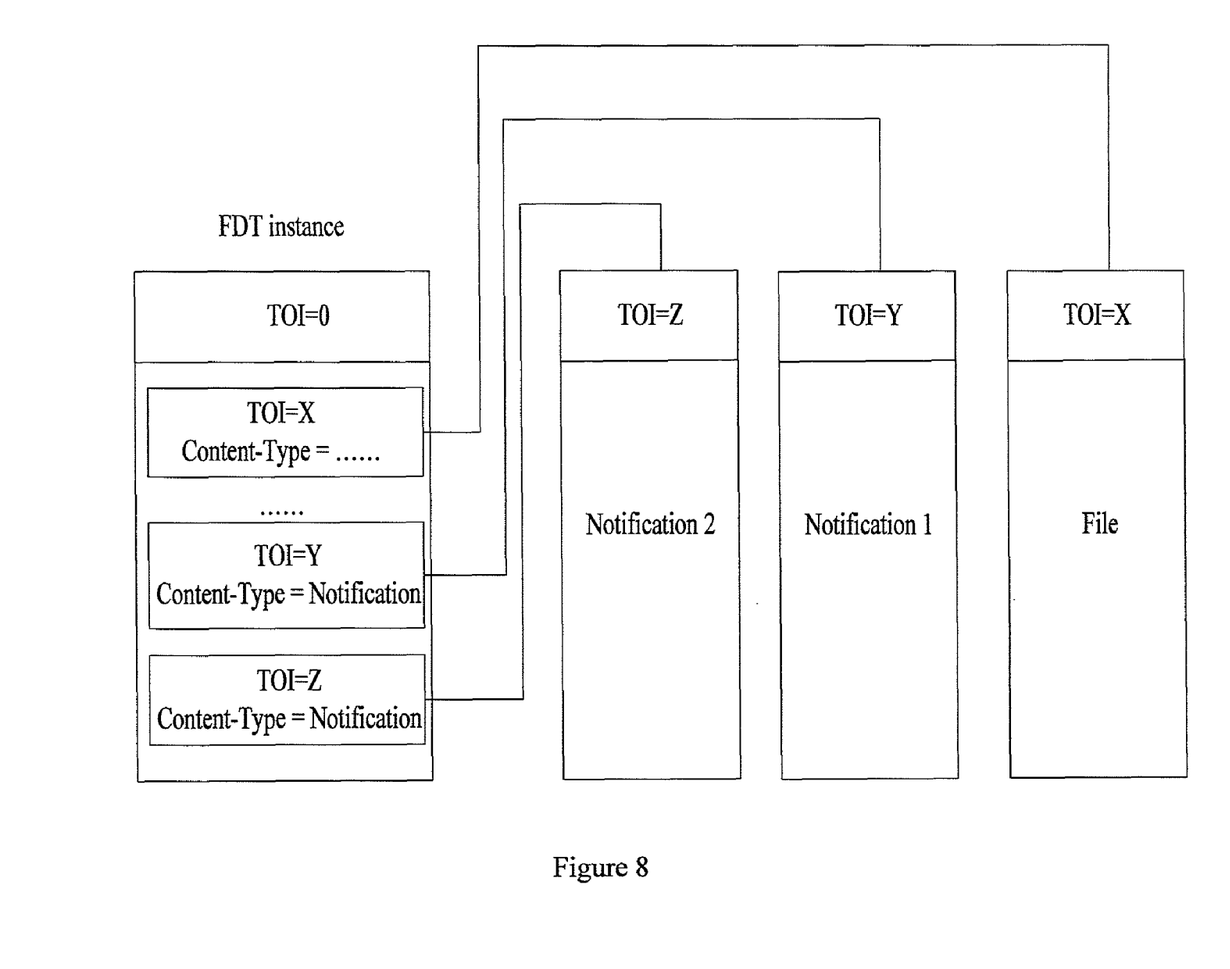
FIG. 8 shows the structure of an FDT and relations between the FDT and transport objects in the one embodiment.

After the general FDT is extended according to the above method in the one embodiment, the structure of the FDT and the relations between the FDT and transport objects are as shown in FIG. 8. In FIG. 8, the FDT describes information of transport objects being transported in the current FLUTE session. The TOIs of the three transport objects shown in FIG. 8 are respectively X, Y and Z. The Content-Type attribute of the transport objects with TOI=Y and TOI=Z is set to Notification, indicating that the two corresponding transport objects with TOI=Y and TOI=Z carry notification messages.

In this step, after the general FDT is extended as in Table 2, the step of generating an FDT according to the notification related information and the TOI assigned to the notification content includes following steps:

Setting the Content-Type attribute of the FILE element in the FDT shown in Table 2 to Notification, setting the TOI attribute of the FILE element to the TOI of the transport object carrying the notification content, and carrying the notification related information in the Notifi element. More specifically, the header information of the notification related information is carried in a sub-element that carries notification header information (the Header sub-element in Table 2) and the header extension information of the notification related information is carried in a sub-element that carries notification header extension information (the HeaderExtension sub-element in Table 2).

The above Notifi element carries at least an ID of the notification, a version of the notification and a service ID of the notification. Preferably, the ID and the version of the notification may be carried in the Header sub-element and the service ID of the notification may be carried in the HeaderExtension sub-element. In practice, the Notifi element may carry other notification related information as needed. For example, the HeaderExtension sub-element may carry the filter parameter, the expiry time, the priority and the provider ID of the notification.

For example, the server generates a notification message at a certain time and the notification content is carried in a transport object with TOI=2. Another file is carried in a transport object with TOI=3 in the current FLUTE session. Then, the FDT sent by the FDT generating module to the receiving module via the broadcasting network is as follows:

```
TOI=0
FDT-Instance{
File{
TOI=3;
Content-Type="txt"
}
File{
TOI=2;
Content-Type="Notification"
Notifi{
Header{
Notification ID=123;
Notification Version=2;
}
HeaderExtension{
Notification Service ID=4;
Notification Expiry Time=15:30;
Notification Priority=2;
Notification Provider ID=5;
}
}
}
}
```

Step 706: The transmitting module sends the FDT to the terminal via the broadcasting network.

Step 707: The terminal receives the FDT and determines a TOI of the notification message to be received according to the obtained notification related information and the obtained TOI.

In this step, after the terminal receives the FDT in the FLUTE session, the terminal may first judge the Content-type value of the FILE element. When the Content-Type is Notification, the terminal obtains the Notifi element in the FILE element of the FDT as the notification related information and obtains the value of the TOI attribute of the FILE element of the FDT as the TOI of the transport object carrying the notification content. The obtained related information includes at least: ID of the notification, version of the notification, and service ID of the notification; if the FDT also carries other related information of the notification, the terminal may also obtain the filter parameter, the expiry time, the priority and the provider ID of the notification.

Specific to the FDT instance in step 705, the terminal determines according to the received FDT that the transport object with TOI=2 carries the notification content.

In this step, after the terminal obtains the related information of the notification being transported in the current FLUTE session, the terminal may further screen the notification being transported in the current FLUTE session according to the obtained notification related information in order to assign the TOI of the notification message to be received. If the terminal obtains a notification filter parameter, the terminal may further filter the notification message according to the filter parameter of the notification after screening notification messages. In this way, the terminal only receives notifications that the terminal cares about so as to save the processing resources of the terminal.

Step 708: The transport content generating module packs the notification content according to the assigned TOI and sends the notification content to the transmitting module through carrying the notification content in a corresponding transport object.

The notification content may be carried in a corresponding transport object in the same way as a normal file is packed in the conventional art. Here, the notification content may include: a text content, an image and an audio/video file. Because the FLUTE protocol is adopted to transport the notification content, the server is able to deliver more text contents to the terminal.

Step 709: The transmitting module sends the transport object that carries the notification content via the broadcasting network.

Step 710: The terminal receives and processes the notification content carrying in the transport object.

Now, the procedure of a method for transporting/receiving a notification via FLUTE according to the one embodiment ends.

Figure 9:
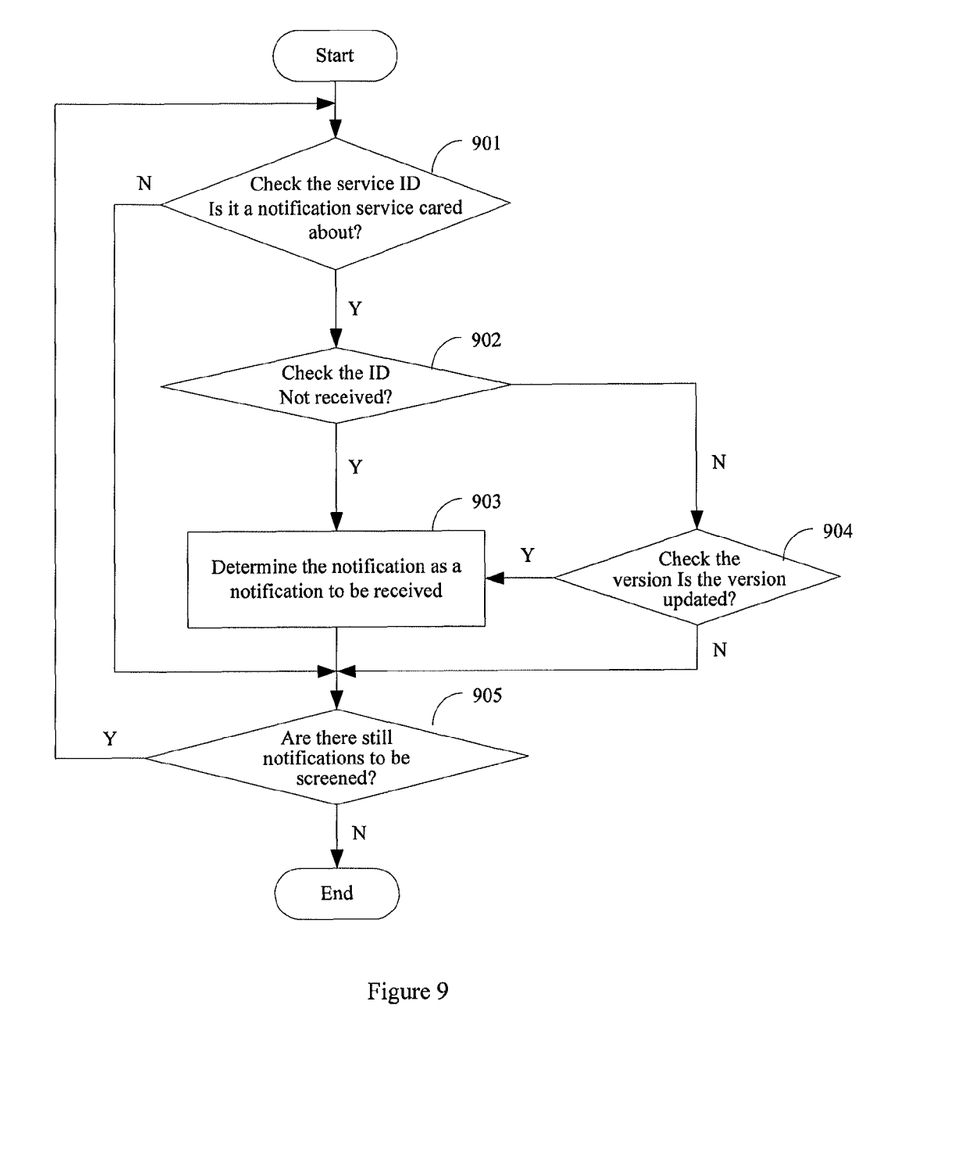
FIG. 9 shows a procedure where a terminal screens notification messages in the one embodiment.

In step 707 of the method shown in FIG. 7, the method for screening notification messages is shown in FIG. 9. As shown in FIG. 9, the method includes the following steps:

Step 901: The terminal determines whether the notification message is a notification service that the terminal cares about according to the service ID of the notification and if so, the procedure goes to step 902, or else goes to step 905.

Step 902: The terminal determines whether it has already received the corresponding transport object of the notification according to the notification ID and if not, the procedure goes to step 903, if so, the procedure goes to step 904.

Step 903: The terminal determines the notification as a notification to be received and continues with step 905.

Step 904: The terminal determines whether the version of notification saved locally is updated according to the received notification version and if so, the procedure goes to step 903, or else goes to step 905.

Step 905: The terminal determines whether there are other notification messages to screen and if so, step 901 is repeated to screen the next notification, or else the procedure is ended.

After the terminal screens notification messages in the foregoing method, the terminal obtains the TOI of the notification to be received so that the terminal is able to receive the corresponding transport object according to the obtained TOI.

Now, the method for screening notification messages shown in FIG. 9 ends.

In step 705 shown in FIG. 7, the following method may be adopted to extend the prior FDT:

A Notification element is added in the FDT-Instance element of the general FDT to indicate that the corresponding transport object carries a notification message; a TOI attribute and a Notifi element are added in the Notification element, where the Notifi element carries notification related information. After the above extension, the extended FDT is as shown in Table 3.

TABLE 3

| Parameter | Type | Quantity | Description |
| --- | --- | --- | --- |
| FDT-Instance | E | 1 | FDT instance element. |
| anyAttribute | A | | anyAttribute may be extended to any other attribute. |
| ... | ... | ... | ... |
| FILE | E1 | 0 ... N | File element, describing a file. |
| Content-Location | A | 1 | File location attribute, described by a URL address. |
| TOI | A | 1 | Transport object identifier. |
| Content-Type | A | 0 ... 1 | File type. |
| Notification | E1 | 0 ... N | Notification element, describing a message. |
| Content-Location | A | 1 | File location attribute, described by a URL address. |
| TOI | A | 1 | Transport object identifier of the message. |
| Notifi | E2 | 0 ... 1 | Notification related element. |
| Header | E2 | | Message header information. |
| XX | A | | |
| ... | ... | ... | |
| HeaderExtension | E2 | | Message header extension information. |
| XX | A | | |
| ... | ... | ... | ... |
| | | | ... |

After the general FDT is extended as in Table 3, the step of generating an FDT according to the notification related information and the TOI assigned to the notification content includes: carrying the Notification element shown in Table 3 in the FDT-Instance element, setting the TOI attribute of the Notification element to the TOI of the transport object that carries the notification content, and carrying the notification related information in the Notifi element. As previously described, the Notifi element here may also include the Header information and HeaderExtension information shown in Table 2.

In the above description of the technical solution disclosed by the one embodiment for transporting/receiving a notification message via FLUTE, the prior FDT is extended so that the server carries a notification content in a transport object and carries the notification related information and the TOI of the transport object carrying the notification content in the first FDT, and then sends the first FDT that carries the notification related information and the TOI along with the transport object carrying the notification content in a FLUTE session; the terminal obtains the related information of the notification being transported in the current FLUTE session and the TOI of the transport object carrying the notification content from the first FDT, and finally receives the transport object carrying the notification content in the current FLUTE session according to the obtained related information and the TOI. Thus, the procedure for transporting/receiving a notification message is implemented.

In the above technical solution provided in the one embodiment, because a server is able to send the related information and notification content to a terminal, the terminal is able to receive the related information and the notification content in the current FLUTE session. Therefore, it is simpler to transport a notification message and quicker for the terminal to obtain the notification message. In addition, because the FLUTE protocol itself provides forward error correction, the reliability of notification transport is ensured.

The following describes the method for transporting notification related information via a special FDT in an embodiment.

Another One Embodiment

In this embodiment, the server first sets a special FDT to the first FDT, which means that the notification related information and the TOI of the transport object carrying the notification content are carried in the special FDT. Accordingly, the terminal obtains the notification related information and the TOI of the transport object carrying the notification content from the special FDT and receives the corresponding transport object according to the obtained related information and the TOI.

Figure 10:
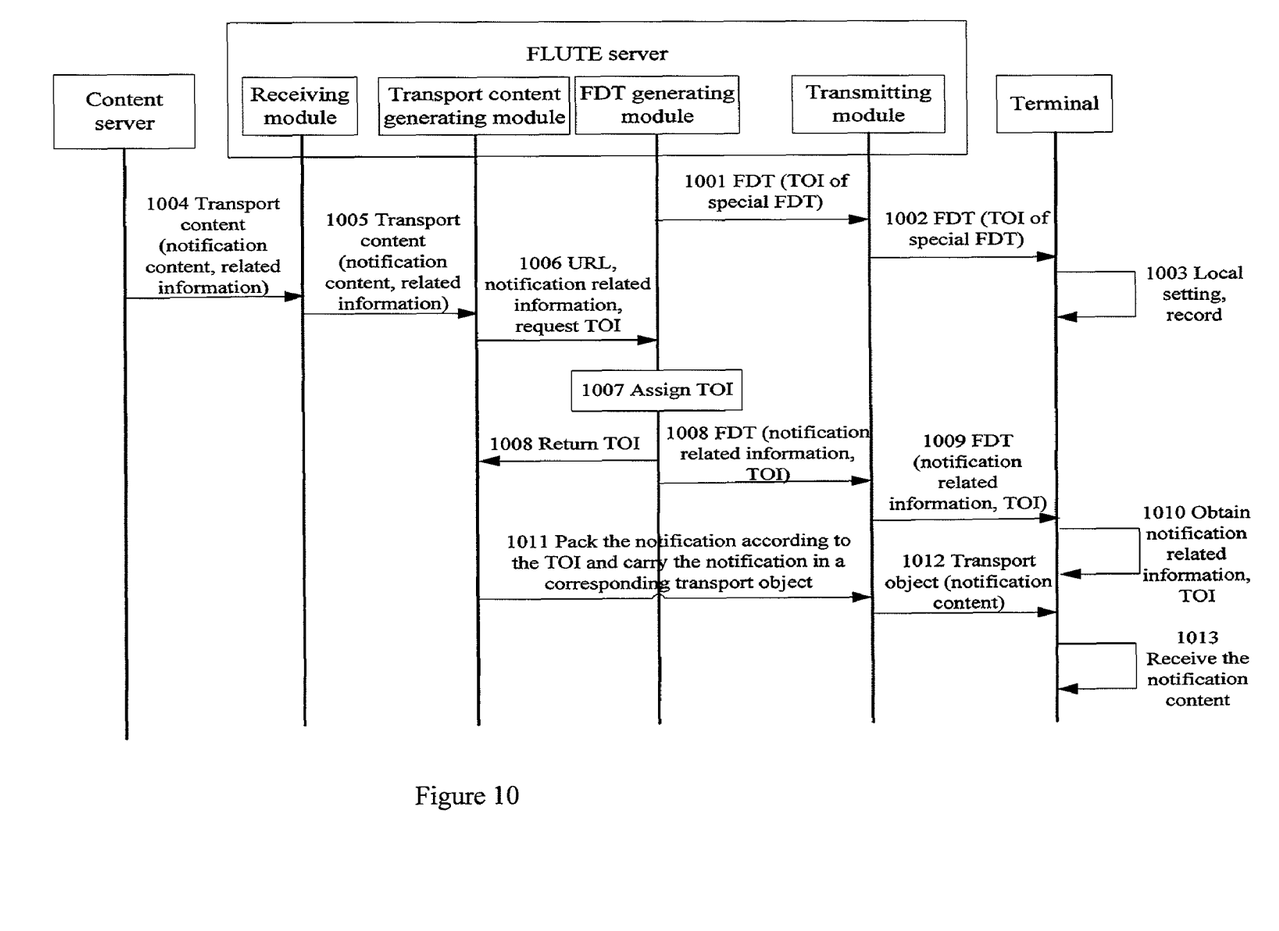
FIG. 10 shows the procedure of a method for transporting/receiving notification messages via FLUTE in another embodiment.

FIG. 10 shows the procedure of a method for transporting/receiving a notification message according to the another embodiment. As shown in FIG. 10, the method includes the following steps:

Step 1001: The FDT generating module adds the TOI of the transport object carrying the special FDT in a general FDT and sends the general FDT to the transmitting module.

In this step, to carry the TOI of the transport object carrying the special FDT in a general FDT, it is necessary to extend the prior FDT.

According to the syntactic definition of XML, anyAttribute of the general FDT shown in Table 1 may be used for flexible attribute extension, that is, the place of anyAttribute may be taken by any attribute. This embodiment provides two modes for extending anyAttribute so as to notify the terminal of the TOI of the transport object carrying the special FDT:

First mode: anyAttribute of the FDT-Instance element of the general FDT shown in Table 1 is extended to FDTNotificationRedirection and the value of the FDTNotificationRedirection attribute is set to Y, the TOI of the transport object carrying the special FDT, indicating that the notification related information is carried in the special FDT carried by the transport object with TOI=Y.

Second mode: anyAttribute is added in one FILE element of the general FDT shown in Table 1 and the added anyAttribute is extended to FDTNotificationRedirection, as shown in Table 4.

TABLE 4

| Parameter | Type | Quantity | Description |
|---|---|---|---|
| FDT-Instance | E | 1 | FDT instance element. |
| anyAttribute | A |  | anyAttribute may be extended to any other attribute. |
| ... | ... | ... | ... |
| FILE | E1 | 0 . . . N | File element, describing a file. |
| Content-Location | A | 1 | File location attribute, described by a URL address. |
| TOI | A | 1 | Transport object identifier. |
| Content-Type | A | 0 . . . 1 | File type. |
| anyAttribute | A |  | anyAttribute may be extended to any other attribute. |

The FDTNotificationRedirection attribute is set true (or any other preset value) and the TOI attribute corresponding to the FILE element is set Y, the TOI of the transport object carrying the special FDT, indicating that the notification related information is carried in the special FDT carried by the transport object with TOI=Y. Here, when the FDTNotificationRedirection attribute is set to any other value, the TOI attribute of the FILE element corresponding to the FDTNotificationRedirection attribute is the value of the TOI of the transport object carrying the special FDT.

Figure 11:
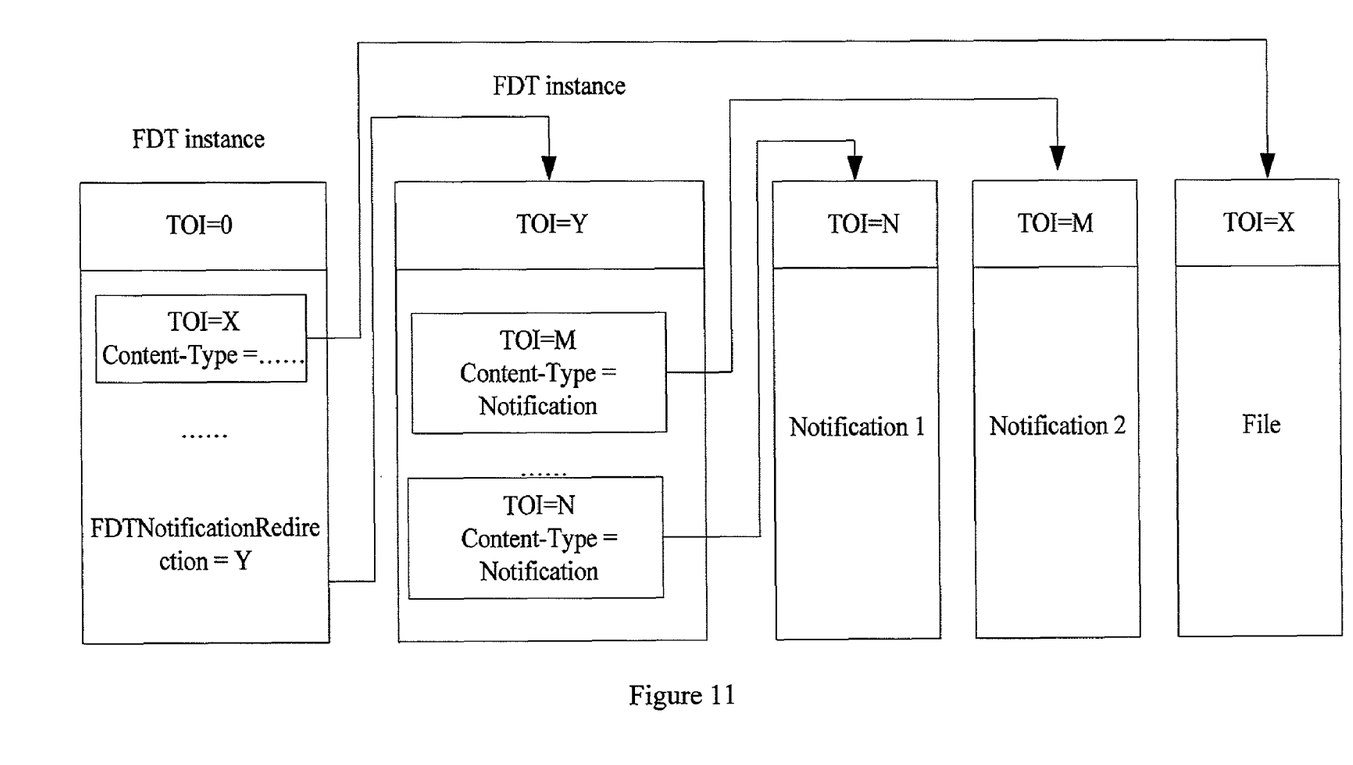
FIG. 11 shows the structure of an FDT and relations between the FDT and transport objects in the another embodiment.

After the general FDT is extended according to the above method in the another embodiment, the FDT structure, the structure of the special FDT, and the relations between the FDT and transport object are shown in FIG. 11. As shown in FIG. 11, the general FDT carried in the transport object with TOI=0 describes information of the transport object transported in the current FLUTE session and the FDTNotificationRedirection information, where the FDTNotificationRedirection information indicates that the related information of the notification transported in the current FLUTE session is carried in a transport object with TOI=Y. The transport object with TOI=Y carries the special FDT in the another embodiment. The FDT includes information of two transport objects with TOI=M and TOI=N. The Content-Type attribute of the transport objects with TOI=M and TOI=N is set to Notification, indicating that, the transport objects, namely the two transport objects with TOI=Y and TOI=Z carry notification messages.

Step 1002: The transmitting module sends the FDT that carries the TOI of the transport object carrying the special FDT to the terminal via the broadcasting network.

Step 1003: After the terminal receives the FDT, the terminal records the TOI of the transport object carrying the special FDT locally and afterwards, obtains the special FDT from the transport object corresponding to the TOI.

In this step, corresponding to the two modes of anyAttribute extension in step 1001, there are two modes for the terminal to obtain the TOI of the transport object carrying the special FDT:

First mode: The terminal determines whether anyAttribute of the FDT-Instance element in the FDT carried in the transport object with TOI=0 is set to FDTNotificationRedirection and if so, obtains the value of the FDTNotificationRedirection attribute as the value of Y.

Second mode: The terminal determines whether anyAttribute of one FILE element of the FDT carried in the transport object with TOI=0 is set to FDTNotificationRedirection and if so, the terminal further determines whether the value of FDTNotificationRedirection is true (or any other preset value), and if it is true, the terminal obtains the value of the FDTNotificationRedirection attribute as the value of the TOI of the transport object that carries the special FDT.

Steps 1004-1007 are the same as steps 701-704 in the one embodiment.

Step 1008: The FDT generating module sends the assigned TOI to the transport content generating module, generates an FDT according to the notification related information and the TOI assigned to the notification content, and sends the generated FDT to the transmitting module in a transport object with TOI=Y.

In this step, the FDT generating module may construct a special FDT in the method described in step 705 in the one embodiment or extend the FDT as shown in Table 3 to obtain the special FDT.

Step 1009: The transmitting module sends the special FDT carried in the transport object with TOI=Y to the terminal via the broadcasting network.

Step 1010: The terminal receives the special FDT and determines the TOI of the notification to be received according to the obtained notification related information and the TOI.

As in the one embodiment, in this step, after the terminal obtains the related information of notifications being transported in the current FLUTE session, the terminal may further screen or filter the notifications being transported in the current FLUTE session according to the obtained notification related information to determine the TOI of the notification message to be received.

Step 1011: The transport content generating module packs the notification content according to the assigned TOI and sends the notification content to the transmitting module in a corresponding transport object.

Step 1012: The transmitting module sends the transport object carrying the notification content via the broadcasting network.

Step 1013: The terminal receives and processes the notification content carried in the transport object.

Now, the procedure of a method for transporting/receiving a notification via FLUTE according to the another embodiment ends.

In the above description of the technical solution disclosed by the another embodiment for transporting/receiving a notification message via FLUTE, a special FDT is used to help a terminal that receives no notification messages to avoid frequent updates of the local FDT. Therefore, in addition to the benefits of the one embodiment such as simplifying the notification transport procedure, making the terminal obtain a notification message more quickly, and improving the reliability of notification transport, the another embodiment also saves resources effectively at the terminal.

The foregoing two embodiments describe the method for transporting a notification message via FLUTE and the method for receiving a notification message via FLUTE in detail. The following describes the server, FLUTE server and content server for transporting a notification message via FLUTE, the terminal for receiving a notification message via FLUTE, and the system for transporting a notification message via FLUTE in detail with reference to the accompanying drawings.

Figure 12:
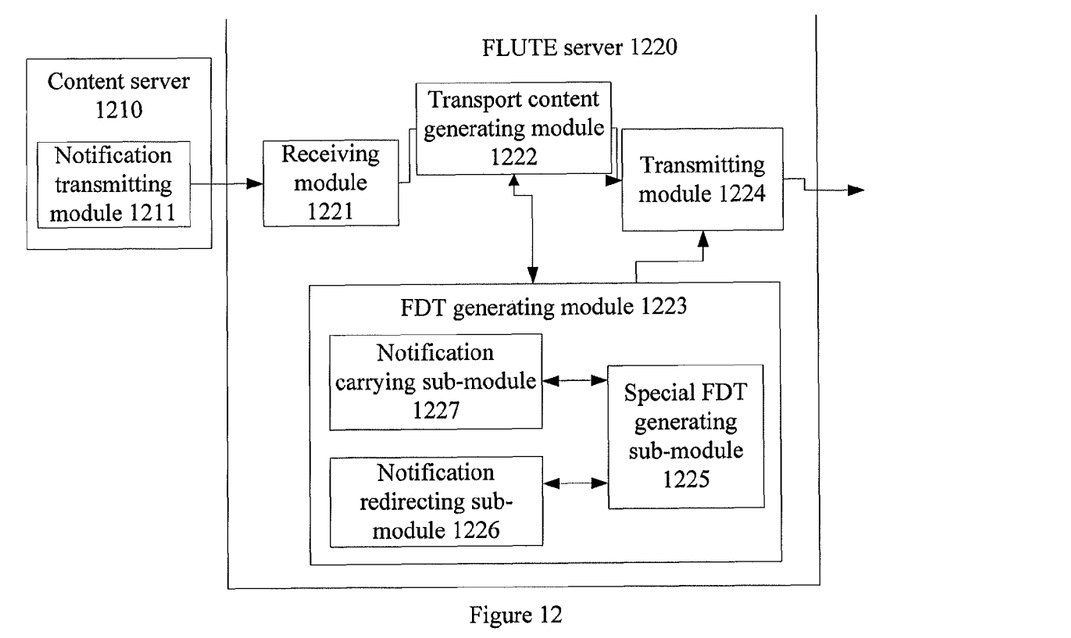
FIG. 12 shows the structure of a server for transporting notification messages via FLUTE in a preferred embodiment.

FIG. 12 shows the structure of a server for transporting a notification message via FLUTE according to a preferred embodiment. As shown in FIG. 12, the server includes a content server 1210 and a FLUTE server 1220.

The content server 1220 is adapted to send a notification content and notification related information to the FLUTE server 1220.

The FLUTE server 1220 is adapted to carry the notification content in a transport object, carry the notification related information and the TOI of the transport object carrying the notification content in a first FDT, and send the first FDT and the transport object carrying the notification content in a FLUTE session.

Preferably, the content server 1210 shown in FIG. 12 may further include a notification transmitting module 1211; the FLUTE server 1220 may further include a receiving module 1221, a transport content generating module 1222, an FDT generating module 1223 and a transmitting module 1224.

The notification transmitting module 1211 in the content server 1210 is adapted to send a notification content and notification related information to the receiving module 1221 in the FLUTE server 1220.

The receiving module 1221 is adapted to send the received notification content and the notification related information to the transport content generating module 1222.

The transport content generating module 1222 is adapted to send the notification related information receiving from the receiving module 1221 to the FDT generating module 1223 and carry the notification content in a transport object corresponding to a TOI returned by the FDT generating module.

The FDT generating module 1223 is adapted to carry the notification related information and the TOI of the transport object that carries the notification content in a first FDT.

The transmitting module 1224 is adapted to send the first FDT and the transport object carrying the notification content to a broadcasting network in a FLUTE session.

Preferably, the FDT generating module 1223 shown in FIG. 12 may further include a special FDT generating sub-module 1225, which may be adapted to generate a special FDT that serves as the first FDT, and adapted to carry the special FDT in a transport object with TOI=Y and send the transport object via the transmitting module 1224, where the value of Y is any positive integer.

Further, the FDT generating module 1223 may include a notification redirecting sub-module 1226, which may be adapted to set anyAttribute of the FDT-Instance element in the FDT carried in the transport object with TOI=0 to FDT-NotificationRedirection and set the FDTNotificationRedirection attribute to Y;

Or, the notification redirecting sub-module 1226 is adapted to set anyAttribute of one FILE element in the FDT carried in the transport object with TOI=0 to FDTNotificationRedirection, set the FDTNotificationRedirection attribute to true, and set the TOI attribute corresponding to the FILE element to Y.

Further, the FDT generating module 1223 may include a notification carrying sub-module 1227, which may be adapted to set the Content-Type attribute of the FILE element of the first FDT to Notification and carry the notification related information in a Notifi element of the FILE element of the first FDT.

The notification carrying sub-module 1227 may also be adapted to carry a Notification element in the first FDT, set the TOI attribute of the Notification element to the TOI of the transport object that carries the notification content, and carry the notification related information in a Notifi element of the Notification element.

Figure 13:
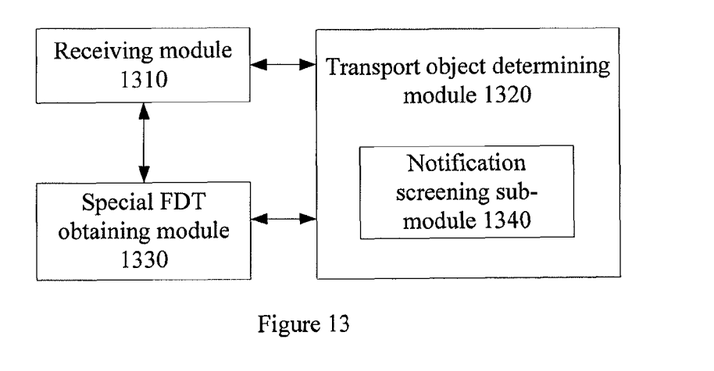
FIG. 13 shows the structure of a terminal for transporting notification messages via FLUTE in a preferred embodiment.

FIG. 13 shows the structure of a terminal for receiving a notification message via FLUTE according to a preferred embodiment. As shown in FIG. 13, the terminal includes a receiving module 1310 and a transport object determining module 1320.

The receiving module 1310 is adapted to receive a first FDT that carries notification related information and the TOI of a transport object carrying a notification content and send the first FDT to the transport object determining module 1320.

The transport object determining module is adapted to determine the transport object carrying the notification content according to the notification related information and the TOI in the first FDT and notify the receiving module 1310 to receive the transport object.

Further, the terminal shown in FIG. 13 may include a special FDT obtaining module 1330, adapted to determine whether anyAttribute of one FILE element of the FDT carried in a transport object with TOI=0 is set to FDTNotificationRedirection, and if so, continue to determine whether the value of the FDTNotificationRedirection attribute is true, and if it is true, obtain the value of the TOI attribute corresponding to the FILE element and notify the receiving module 1310 to receive the special FDT in the transport object corresponding to the value.

Or, the special FDT obtaining module 1330 is adapted to determine whether anyAttribute of the FDT-Instance element in the FDT carried in a transport object with TOI=0 is set to FDTNotificationRedirection and if so, adapted to obtain the value of the FDTNotificationRedirection attribute and notify the receiving module 1310 to receive the special FDT in the transport object corresponding to the value.

In this case, the receiving module 1310 is adapted to receive the special FDT according to the notification of the special FDT obtaining module 1330 and send the received special FDT as the first FDT to the transport object determining module 1320.

Further, the transport object determining module 1320 shown in FIG. 13 may include a notification screening sub-module 1340, adapted to screen notification messages according to the notification related information in the first FDT received by the receiving module 1310 and notify the transport object determining module 1320 the screening result. Here, the procedure where the notification screening sub-module 1340 screens notification messages is shown in FIG. 9.

With the server shown in FIG. 12 and the terminal shown in FIG. 13, a system for transporting notification messages via FLUTE in an embodiment is formed.

In the above technical solution provided in the embodiments of the present invention, because a server is able to send the notification related information and notification content to a terminal, the terminal is able to receive the notification related information and the notification content in the current FLUTE session. Therefore, it is simpler to transport a notification message and quicker for the terminal to obtain the notification message. In addition, because the FLUTE protocol itself provides forward error correction, the reliability of notification transport is ensured.

Although described through several exemplary embodiments, the claims in the application are not limited to such embodiments. It is apparent that those skilled in the art can make various modifications and variations to the embodiments without departing from the scope of the claims of the application. The claims are intended to cover the modifications and variations.

What is claimed is:

1. A method for receiving a notification message via File Delivery over Unidirectional Transport (FLUTE), comprising:
    obtaining notification related information and a transport object identifier (TOI) of a transport object that carries a notification content from a file description table (FDT), wherein the notification related information carries in the FDT by use of these steps as follows: setting a Content-Type attribute of a FILE element to a Notification type, wherein the Notification type in the Content-Type attribute of a FILE element of the FDT indicates that a corresponding transport object carries a notification message; and carrying the notification related information in a notification related element, wherein the notification related element is in the FILE element of the FDT to carry the notification related information; and
    receiving the transport object that carries the notification content in a current FLUTE session according to the obtained notification related information and the TOI.

2. The method of claim 1, wherein the FDT is a special FDT in the current FLUTE session; and the special FDT is carried in a transport object corresponding to a preset TOI, wherein a value of the preset TOI is any positive integer.

3. The method of claim 2, further comprising obtaining a preset TOI value before obtaining notification related information and the TOI of the notification transported in the current FLUTE session from the FDT.

4. The method of claim 1, wherein obtaining notification related information of a notification being transported in a current FLUTE session from a FDT includes determining that a Content-Type attribute of a FILE element of the FDT is Notification and obtaining a notification related element in the FILE element of the FDT as notification related information.

5. The method of claim 1, wherein obtaining notification related information of a notification being transported in a current FLUTE session and a TOI of a transport object that carries a notification content from a FDT includes determining that the FDT carries a Notification element, obtaining a value of a TOI attribute in the Notification element as the TOI of the transport object that carries the notification content, and obtaining a notification related element in the Notification element as notification related information.

6. The method of claim 1, further comprising screening, after obtaining notification related information of a notification being transported in a current FLUTE session, the notification being transported in the current FLUTE session according to the obtained notification related information to determine a TOI corresponding to a notification message to be received, wherein receiving the transport object that carries the notification content in the current FLUTE session according to the obtained related information and the TOI includes receiving a transport object corresponding to the determined TOI in the current FLUTE session.

7. The method of claim 6, wherein the obtained notification related information includes an ID of the notification, a version of the notification and a service ID of the notification, and wherein screening the notification according to the obtained notification related information includes determining whether the notification is a notification service that a terminal cares about according the service ID of the notification and if not, screening a next notification;
    if so, determining whether a transport object corresponding to the notification is received according to the ID of the notification and if the transport object is not received, determining the notification as a notification to be received and screening a next notification; and
    if the transport object is already received, determining whether the version of the notification is updated according to the version of the notification and if the version is updated, determining the notification as a notification to be received and screening a next notification; if the version is not updated, screening a next notification.

8. The method of claim 1, wherein the FDT is an FDT carried in a transport object with TOI=0.

9. A server for transporting a notification message via File Delivery over Unidirectional Transport (FLUTE), comprising:
    a content server; and
    a FLUTE server,
    wherein the content server is configured to send a notification content and notification related information to the FLUTE server; and
    the FLUTE server includes a processor and is configured to carry the notification content in a transport object, carry the notification related information and a TOI of the transport object that carries the notification content in a file description table (FDT), and send the FDT and the transport object that carries the notification content in a FLUTE session;
    wherein the notification related information carries in the FDT by use of these steps as follows: a Content-Type attribute of a FILE element is set to a Notification type, wherein the Notification type is in the Content-Type attribute of a FILE element of the FDT to indicates that a corresponding transport object carries a notification message; and carrying the notification related information in a notification related element, wherein the notification related element is in the FILE element of the FDT to carry the notification related information.

10. A File Delivery over Unidirectional Transport (FLUTE) server, comprising:
a processor;
a receiving module;
a transport content generating module;
a file description table (FDT) generating module; and
a transmitting module,
wherein the receiving module is executable by the processor and is configured to receive a notification content and notification related information;
the transport content generating module executed by the processor of the FLUTE server, is configured to send the notification related information from the receiving module to the FDT generating module and carry the notification content in a transport object corresponding to a transport object identifier (TOI) returned by the FDT generating module;
the FDT generating module executed by the processor of the FLUTE server, is configured to carry the notification related information and TOI of the transport object that carries the notification content in a FDT, wherein the notification related information carries in the FDT by use of these steps as follows: a Content-Type attribute of a FILE element is set to a Notification type, wherein the Notification type is in the Content-Type attribute of a FILE element of the FDT to indicate that a corresponding transport object carries a notification message; and carrying the notification related information in a notification related element, wherein the notification related element is in the FILE element of the FDT to carry the notification related information; and
the transmitting module executed by the processor of the FLUTE server, is configured to send the FDT and the transport object that carries the notification content in a FLUTE session.

11. The FLUTE server of claim 10, wherein the FDT generating module includes a special FDT generating sub-module; and
the special FDT generating sub-module is configured to generate a special FDT that serves as the FDT, carry the special FDT in a transport object corresponding to a preset TOI, and transmit the transport object via the transmitting module, the preset TOI being any positive integer.

12. The FLUTE server of claim 10, wherein the FDT generating module includes a notification carrying sub-module; and
the notification carrying sub-module is configured to set a Content-Type attribute of a FILE element of the FDT to Notification and carry notification related information in a notification related element of the FILE element of the FDT.

13. The FLUTE server of claim 10, wherein the FDT generating module further includes a notification carrying sub-module; and
the notification carrying sub-module is configured to carry a Notification element in the FDT, set a TOI attribute of the Notification element to the TOI of the transport object that carries the notification content, and carry the notification related information in a Notifi element of the Notification element.

14. A terminal for receiving a notification message via File Delivery over Unidirectional Transport (FLUTE), comprising:
a receiving module; and
a transport object determining module, wherein the receiving module executed by a processor of the terminal, is configured to receive a file description table (FDT) that carries notification related information and a transport object identifier (TOI) of a transport object that carries a notification content and send the FDT to the transport object determining module wherein the notification related information carries in the FDT by use of these steps as follows: setting a Content-Type attribute of a FILE element to a Notification type, wherein the Notification type is in the Content-Type attribute of a FILE element of the FDT to indicate that a corresponding transport object carries a notification message; and carrying the notification related information in a notification related element, wherein the notification related element is in the FILE element of the FDT to carry the notification related information; and
the transport object determining module executed by the processor of the terminal, is configured to determine the transport object that carries the notification content according to the notification related information and the TOI in the FDT and notify the receiving module to receive the transport object.

15. A method for transporting a notification message via File Delivery over Unidirectional Transport (FLUTE), comprising:
carrying a notification content in a transport object, wherein a Content-Type attribute of a FILE element of a FDT is set to a Notification type, wherein the Notification type indicates that a corresponding transport object carries a notification message;
carrying a notification related information in a notification related element, wherein the notification related element is in the File element;
carrying a transport object identifier (TOI) of the transport object that carries the notification content in the FDT; and
sending the FDT and the transport object that carries the notification content in a FLUTE session.

16. The method of claim 15, wherein the FDT is a special FDT in the FLUTE session; and the special FDT is carried in a transport object corresponding to a preset TOI, wherein a value of the preset TOI is any positive integer.

17. The method of claim 15, wherein carrying the notification related information in the notification related element comprises: carrying header information of the notification related information in a sub-element that carries header information of the notification message and carrying header extension information of the notification related information in a sub-element that carries header extension information of the notification message.

18. The method of claim 15, wherein the FDT is an FDT carried in a transport object with TOI=0.

* * * * *